United States Patent [19]
Brilka et al.

[11] Patent Number: 5,483,298
[45] Date of Patent: Jan. 9, 1996

[54] CIRCUIT ARRANGEMENT FOR DEMMODULATING THE SOUND SIGNALS IN A TELEVISION SIGNAL IN ACCORDANCE WITH AT LEAST TWO DIFFERENT TRANSMISSION STANDARDS

[75] Inventors: Joachim Brilka; Wolfgang Weltersbach, both of Hamburg, Germany

[73] Assignee: U.S. Philips Corporation, New York, N.Y.

[21] Appl. No.: 239,014

[22] Filed: May 5, 1994

[30] Foreign Application Priority Data

May 7, 1993 [DE] Germany .......................... 43 15 128.0

[51] Int. Cl.[6] .............................. H04N 5/60; H04N 5/44; H04N 7/08; H04N 7/093
[52] U.S. Cl. .......................... 348/738; 348/736; 348/480; 348/482; 348/484
[58] Field of Search .................................. 348/738, 480, 348/482, 484, 736; H04N 7/093, 5/60, 5/44, 7/08, 7/087

[56] References Cited

U.S. PATENT DOCUMENTS

| | | | |
|---|---|---|---|
| 4,511,924 | 4/1985 | Griffis et al. | 358/197 |
| 4,562,472 | 12/1985 | Carlson | 358/197 |

OTHER PUBLICATIONS

M. McGinn, "An advanced I.F. amplifier and AFT system suitable for HDTV", IEEE Transactions on Consumer Electronics, vol. 36, No. 3, Aug. 1990, pp. 407–413.

U. Buhse, "The german 2–carrier–system for trrestrial TV–sound transmission systems and integrated circuits for 'high–quality' TV–receivers", IEEE Transactions on Consumer Electronics, vol. 28, No. 4, Nov. 1982, pp. 489–503.

Primary Examiner—James J. Groody
Assistant Examiner—Nina N. West
Attorney, Agent, or Firm—Edward W. Goodman

[57] ABSTRACT

A circuit arrangement for demodulating the sound signals in a television signal is described, which circuit arrangement ensures a simple and low-cost structure, also for operation at different transmission standards.

To this end, the circuit arrangement according to the invention includes an oscillation-generating stage which derives a (first) oscillation from a television signal (IF television signal) modulated on a first intermediate-frequency carrier oscillation, whose frequency corresponds to the frequency of an intermediate-frequency picture carrier oscillation in the IF television signal and encloses a phase angle of at least substantially 90° with the picture carrier oscillation, a (first) mixer stage, a first input of which can receive the (first) oscillation, and a switching device for optionally applying the IF television signal or a sound signal (IF sound signal) modulated on a second intermediate-frequency carrier oscillation to a second input of the (first) mixer stage.

18 Claims, 1 Drawing Sheet

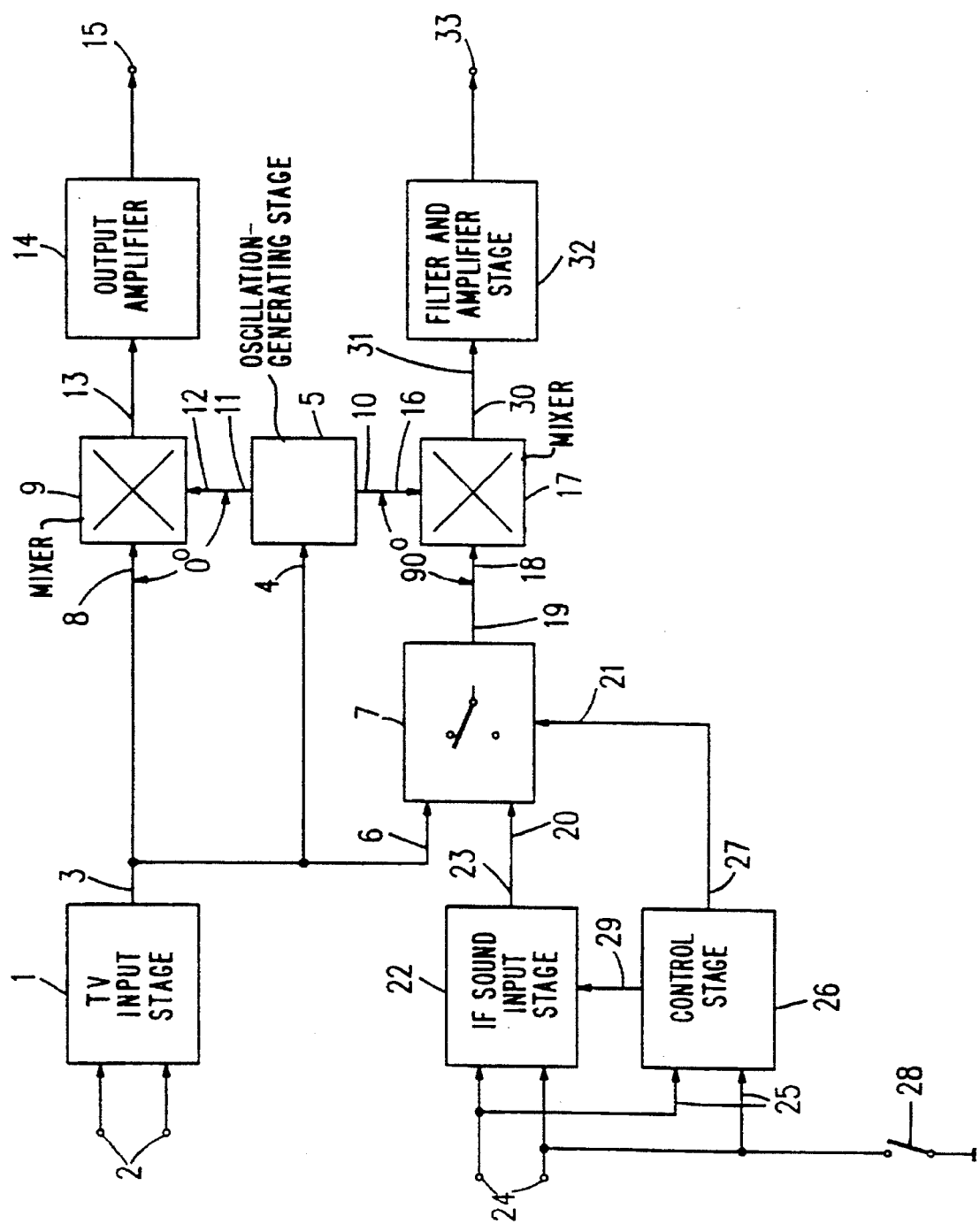

5,483,298

CIRCUIT ARRANGEMENT FOR DEMMODULATING THE SOUND SIGNALS IN A TELEVISION SIGNAL IN ACCORDANCE WITH AT LEAST TWO DIFFERENT TRANSMISSION STANDARDS

BACKGROUND OF THE INVENTION

1. Field of the Invention

The invention relates to a circuit arrangement for demodulating the sound signals in a television signal.

2. Description of the Related Art

Television receivers for receiving television signals of different transmission standards are used to extend the possibilities of receiving different transmitters, hence the universal availability in broadcast areas of television transmitters operating at different transmission standards; particularly, such receivers are used for receiving television transmissions in different countries. With the availability of transmitting television programs via satellites within a single country, it is nowadays also an object to optionally receive television broadcasts using different transmission standards. Reservation of a separate, complete receiver for each of these standards is very uneconomical. The aim therefore is to handle all transmission standards available at a receiver location with a single apparatus. Then the problem presents itself that the television signals of the different standards, particularly in the intermediate frequency band, i.e. in a state modulated on an IF carrier oscillation, have different modulation frequencies and modulation types and consequently require different treatments when they are demodulated.

SUMMARY OF THE INVENTION

It is an object of the invention to provide a circuit arrangement which, with few components, provides the possibility of demodulating the sound signals in the television signals of different transmission standards.

To this end the circuit arrangement according to the invention comprises an oscillation-generating stage which derives a (first) oscillation from a television signal (IF television signal) modulated on a first IF carrier oscillation, whose frequency corresponds to the frequency of an IF picture carrier oscillation in the IF television signal and encloses a phase angle of at least substantially 90° with the picture carrier oscillation, a (first) mixer stage, a first input of which can receive the (first) oscillation, a switching device for optionally applying the IF television signal or a sound signal (IF sound signal) modulated on a second IF carrier oscillation to a second input of the (first) mixer stage.

The circuit arrangement according to the invention particularly provides the possibility of demodulating, as desired, sound signals in a television signal in accordance with the intercarrier method and the Quasi-split sound (QSS) method in a simple way, using a small number of components. A known "intercarrier" processing of the sound signals is suitable for simplified circuit arrangements for demodulating the sound signals in television signals of different transmission standards or for low-cost circuits for processing stereo sound signals in accordance with the C.C.I.R. B/G television transmission standard. In such a signal processing method, all signal processing stages which are specially required for demodulation in accordance with the QSS method are not used, but the IF sound signal which is modulated on two IF sub-carrier oscillations, whose frequencies are typically 5.5 MHz and 5.74 MHz higher than the frequency of the picture carrier oscillation is demodulated in frequency demodulator stages subsequent to the demodulation of the IF television signal. The required number of filter components for the QSS method is thereby reduced.

The circuit arrangement according to the invention provides the simple possibility, i.e. using a simple structure, of demodulating in accordance with the intercarrier method and the QSS method. A very simple adaptation to the requirements of processing the television signals is thus possible.

When the circuit arrangement according to the invention operates in accordance with the QSS method, the IF sound signal is applied to the second input of the (first) mixer stage via the switching device and is mixed in this stage with the (first) oscillation which corresponds to the picture carrier oscillation, but for a phase shift of 90°. If the circuit arrangement operates in accordance with the intercarrier method, the IF television signal is applied to the second input of the (first) mixer stage via the switching device and mixed with the (first) oscillation. Based on the phase angle of 90° between the picture carrier oscillation in the IF television signal and the (first) oscillation, television signal components which could stray into the frequency range of the sound signals, are suppressed satisfactorily during mixing. A television signal-dependent interference phase modulation can thereby be obviated substantially, so that a very good signal-to-noise ratio for the sound signals is gained. Since only a single IF filter is required for the subsequent processing of the sound signals, via which filter the sound signals are supplied for all transmission standards, a very small number of filter circuits is required for the circuit arrangement according to the invention.

In a preferred embodiment of the circuit arrangement according to the invention, this circuit arrangement comprises a control stage by which a switching signal for activating the switching device can be derived when a predetermined signal level of the IF sound signal is reached. In this way the switching device can be activated without separately supplying the switching signal and hence without a separate lead for this switching signal. The switching information is superimposed on the IF sound signal, preferably as a d.c.level.

Advantageously, the control stage comprises a comparator for detecting the instant when the IF sound signal reaches the predeterminable signal level. In the comparator, a d.c. level in the IF sound signal may preferably be compared with a predeterminable reference level.

A very simple embodiment is obtained if the IF sound signal is applied via two terminals and if one of the terminals is impressed with a fixed reference level for reaching the predeterminable signal level between the two terminals. In the case of operation in accordance with the transmission standards in which the (first) mixer stage is to receive the IF television signal, and thus the signal path of the separate IF sound signal is not required, the latter is advantageously controlled at a fixed reference level, particularly a defined d.c.level. In the simplest case, one of the terminals for applying the IF sound signal is connected to a defined potential, for example ground via a short-circuit switch. The comparator then switches off the signal path of the separate IF sound signal.

In an advantageous further embodiment of the invention, the circuit arrangement is combined with an arrangement for demodulating picture signals in the television signal in such a way that the oscillation-generating stage derives a second oscillation from the IF television signal, whose frequency and phase correspond to those of the picture carrier oscillation and which is applied to a first input of a second mixer stage whose second input can receive the IF television signal for demodulation. The oscillation-generating stage is thus also utilized for processing the picture signals.

These and other aspects of the invention will be apparent from and elucidated with reference to the embodiments described hereinafter.

BRIEF DESCRIPTION OF THE DRAWINGS

In the drawing, the sole FIGURE shows an embodiment according to the invention.

DESCRIPTION OF THE PREFERRED EMBODIMENT

In this circuit arrangement, an IF television signal is applied to an IF television input stage 1 via a two-terminal input 2. The IF television signal is available at the output 3 of the IF television input stage 1 after a processing operation performed in this stage, particularly an amplification. It is applied from this output to an input 4 of an oscillation-generating stage 5, a first input 6 of a switching device 7 and a second input 8 of a second mixer stage 9.

In the oscillation-generating stage 5, which preferably comprises a phase-locked loop, a first and a second oscillation are derived from the IF television signal whose frequencies correspond to the frequencies of an intermediate-frequency picture carrier oscillation in the IF television signal. This picture carrier oscillation preferably also corresponds to the first intermediate-frequency carrier oscillation on which the television signal is modulated. The first and the second oscillation mutually enclose a phase angle of 90°, the second oscillation being in phase with the picture carrier oscillation. The first oscillation is supplied by the oscillation-generating stage 5 from a first output 10 and the second oscillation is applied from a second output 11.

The IF television signal is thus applied to the second input 8 of the second mixer stage 9 and the second oscillation from the second output 11 of the oscillation-generating stage 5 is applied to a first input 12. In the second mixer stage 9 a demodulated television signal is produced by mixing these signals, which demodulated television signal is applied from the output 13 of the second mixer stage 9 and applied to a terminal 15 via an output amplifier 14. The television signal in the baseband as well as a sound signal modulated on one or more intercarrier oscillations can be taken from the terminal 15.

The first oscillation from the first output 10 of the oscillation-generating stage 5 is applied to a first input 16 of a first mixer stage 17. A second input 18 of the first mixer stage 17 is connected to an output 19 of the switching device 7. Instead of the first input 6, a second input 20 of the switching device 7 may alternately be connected to the output 19, for which purpose the switching device 7 can receive a switching signal via a switching input 21. The switching device 7 is preferably activated in dependence upon the transmission standard of the IF television signal at the input 2 in such a way that the IF television signal for at least a first transmission standard of the television signal is applied from the first input 6 to the second input 18 of the first mixer stage 17 and an IF sound signal for at least a second transmission standard of the television signal is applied from the second input 20 of the switching device 7 to the second input 18 of the first mixer stage 17. Particularly in the B/G transmission standard, the first input 6 of the switching device 7 is connected to its output 19, with the IF sound signals then being demodulated in accordance with the intercarrier method. However, in the QSS method, a separate IF sound signal is applied from the second input 20 to the second input 18 of the first mixer stage 17.

An output 23 of an IF sound input stage 22 precedes the second input 20 of the switching device 7. The IF sound input stage 22 preferably comprises amplifier stages and possibly other devices for preparing the IF sound signals in a form in which they can be processed by the first mixer stage 17. The IF sound signal is applied to a two-terminal input 24 of the IF sound input stage 22. The input 24 is also connected to a similar two-terminal input 25 of a control stage 26 whose output 27, which is connected to the switching input 21 of the switching device 7, can supply the switching signal.

The control stage 26 comprises a comparator by which the difference between the signal levels at the two terminals of the input 25 of the control stage 26 is preferably determined. If this difference reaches a predeterminable reference level, i.e. if the IF sound signal constituting this difference exceeds a predeterminable signal level, the comparator detecting this exceeding supplies a switching signal from the output 27 in the control stage 26, by which switching signal the first input 6 in the switching device 7 is connected to the output 19. In the embodiment shown in the FIGURE one of the terminals of the input 24 and of the input 25 can be connected to ground via a switch 28. A fixed reference level, in this example ground potential, is thereby impressed on this terminal. The voltage difference at the terminals of the input 25, i.e. the d.c.level of the IF sound signal applied, is raised above the predetermined signal level (reference level) in this way. With this arrangement, a separate input for the control stage 26 is avoided. This is particularly significant when the circuit arrangement described is to be integrated on a single semiconductor body, because the number of contacts for such an integrated circuit can be reduced or maintained at a low number. The predeterminable signal level (reference level) is 1 V in a dimensional example, but it may be slightly adapted to the signals which are present. The switch 28 formed with, for example transistors, may be arranged outside the described integrated circuit.

A control lead 29 of the control stage 26 is connected to the IF sound input stage 22. Simultaneously with the switching signal at the output 27, the IF sound input stage 22 is rendered inoperative via this control lead 29 when the first input 6 in the switching device 7 is connected to the output 19 and thus the IF sound signal from the input 24 is not evaluated by the circuit arrangement. The required electric power can thus be reduced in the corresponding state of operation.

The output 30 of the first mixer stage 17 is connected to an input 31 of a filter and amplifier stage 32 whose output 33 supplies the sound signals as intercarrier signals. For all transmission standards to be processed, i.e. in the operating conditions characterized by the two switching positions of the switching device 7, the sound signals at the output 30 have signal parameters which correspond to one another in such a way that the filter and amplifier stage 32 can be used for all transmission standards without varying its dimensioning. For example, in the intercarrier method, the sound signals in the IF television signal at the output 3 of the IF television input stage 1 are modulated with the picture carrier oscillation of the IF television signal in such a way that they are modulated on sound carrier oscillations of the frequencies 5.5 MHz and 5.74 MHz and supplied as intercarrier signals from the output 30. In the QSS method the IF sound signals are supplied by the IF sound input stage 22 and modulated on carrier oscillations of 33.4 MHz and 33.16 MHz. The intercarrier signals are also obtained in this case by mixing with the picture carrier oscillation in the first mixer stage 17.

We claim:

1. A circuit arrangement for demodulating sound signals in a television signal, comprising:

an oscillation-generating stage which derives a first oscillation signal from an IF television signal modulated on a first intermediate-frequency carrier having a frequency which corresponds to a frequency of an intermediate-frequency picture carrier in the IF television signal and encloses a phase angle of at least substantially 90° with the intermediate-frequency picture carrier;

a first mixer stage having a first input for receiving the first oscillation signal; and a switching device for optionally applying the IF television signal or an IF sound signal modulated on a second intermediate-frequency carrier to a second input of the first mixer stage.

2. A circuit arrangement as claimed in claim 1, characterized in that for at least a first transmission standard of the television signal, the IF television signal is applied by the switching device to the second input of the first mixer stage, and for at least a second transmission standard of the television signal, the IF sound signal is applied by the switching device to the second input of the first mixer stage.

3. A circuit arrangement as claimed in claim 1, characterized in that the circuit arrangement further comprises a control stage coupled to receive said IF sound signal, said control stage deriving a switching signal for activating the switching device when a signal level of the IF sound signal reaches a predeterminable signal level.

4. A circuit arrangement as claimed in claim 3, characterized in that the control stage comprises a comparator for detecting the instant when the the signal level of the IF sound signal reaches the predeterminable signal level.

5. A circuit arrangement as claimed in claim 3, characterized in that the IF sound signal is applied via two terminals, and in that one of the terminals is impressed with a fixed reference level, whereby the predeterminable signal level is measured between the two terminals.

6. A circuit arrangement as claimed in claim 1, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

7. A circuit arrangement as claimed in claim 2, characterized in that the circuit arrangement further comprises a control stage coupled to receive said IF sound signal, said control stage deriving a switching signal for activating the switching device when a signal level of the IF sound signal reaches a predeterminable signal level.

8. A circuit arrangement as claimed in claim 7, characterized in that the control stage comprises a comparator for detecting the instant when the the signal level of the IF sound signal reaches the predeterminable signal level.

9. A circuit arrangement as claimed in claim 7, characterized in that the IF sound signal is applied via two terminals, and in that one of the terminals is impressed with a fixed reference level, whereby the predeterminable signal level is measured between the two terminals.

10. A circuit arrangement as claimed in claim 8, characterized in that the IF sound signal is applied via two terminals, and in that one of the terminals is impressed with a fixed reference level, whereby the predeterminable signal level is measured between the two terminals.

11. A circuit arrangement as claimed in claim 2, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

12. A circuit arrangement as claimed in claim 3, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

13. A circuit arrangement as claimed in claim 4, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

14. A circuit arrangement as claimed in claim 5, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

15. A circuit arrangement as claimed in claim 7, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

16. A circuit arrangement as claimed in claim 8, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

17. A circuit arrangement as claimed in claim 9, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

18. A circuit arrangement as claimed in claim 10, characterized in that the oscillation-generating stage derives a second oscillation signal from the IF television signal, said second oscillation signal having a frequency and phase corresponding to those of the picture carrier oscillation, said second oscillation signal being applied to a first input of a second mixer stage having a second input for receiving the IF television signal for demodulation.

* * * * *